United States Patent [19]

Hammon

[11] 4,304,540

[45] Dec. 8, 1981

[54] HYDRAULIC PRESS

[76] Inventor: Carl K. Hammon, 236 Oakleaf Dr., Rte. 1, Morehead City, N.C. 28557

[21] Appl. No.: 187,166

[22] Filed: Sep. 15, 1980

[51] Int. Cl.[3] .................... B29F 1/00

[52] U.S. Cl. .................... 425/150; 425/451.2; 425/595; 425/590

[58] Field of Search .................... 425/150, 450.1, 451.2, 425/451.9, 589, 590, 595, DIG. 221, DIG. 223

[56] References Cited

U.S. PATENT DOCUMENTS

| | | | |
|---|---|---|---|
| 2,689,978 | 9/1954 | Roger | 425/451.2 |
| 2,862,238 | 12/1958 | Ceizzi | 425/451.2 |
| 3,093,863 | 6/1963 | Ehlert | 425/451.2 |
| 3,120,039 | 2/1964 | Stübbe et al. | 425/DIG. 223 |
| 3,465,387 | 9/1969 | Allard et al. | 425/590 X |
| 3,505,708 | 4/1970 | Moslo | 425/589 X |
| 3,528,134 | 9/1970 | Fischbach | 425/595 X |
| 3,540,081 | 11/1970 | Carrieri et al. | 425/595 X |
| 3,540,524 | 11/1970 | Bachelier | 425/595 X |
| 3,669,599 | 6/1972 | Snider et al. | 425/595 |
| 3,716,323 | 2/1973 | Classen | 425/451.2 |
| 3,801,256 | 4/1974 | Farrell | 425/590 X |
| 3,951,579 | 4/1976 | Myers et al. | 425/450.1 X |

*Primary Examiner*—J. Howard Flint, Jr.

[57] ABSTRACT

A hydraulic press includes long stroke piston cylinder assemblies to drive a movable platen along four pull down power rods between an upper open position and a lower reference position immediately adjacent to and parallel with the stationary platen, a wedge ring clamp mechanism selectively to lock the movable platen to the four pull down power rods at either the upper or lower reference positions, and short stroke piston cylinder assemblies operative reciprocally axially to drive the four pull down power rods when the upper platen is locked thereon to move said locked upper platen between said reference position and a closed position in which the two platens are loaded under high forming pressure. The short stroke piston cylinder assemblies are controlled for simultaneous but also independently adjustable movements to maintain parallelism between the upper and lower platens and also to maintain force and velocity control over the upper platen during the short stroke movement of the upper platen between the reference position and the closed forming position. The movable platen is centered and guided in its movements by adjustable wedge guide mechanisms on the movable platen cooperating with wear plates on the press frame.

12 Claims, 8 Drawing Figures

48
22
47
48
48
37
45
47
37
-18-
49
37
41
-32-
47
48

18
3
45
45
20
32
22
34
39
44
31
36
42

48
43
41
37
40
3
49
47
35
48
38
33
23

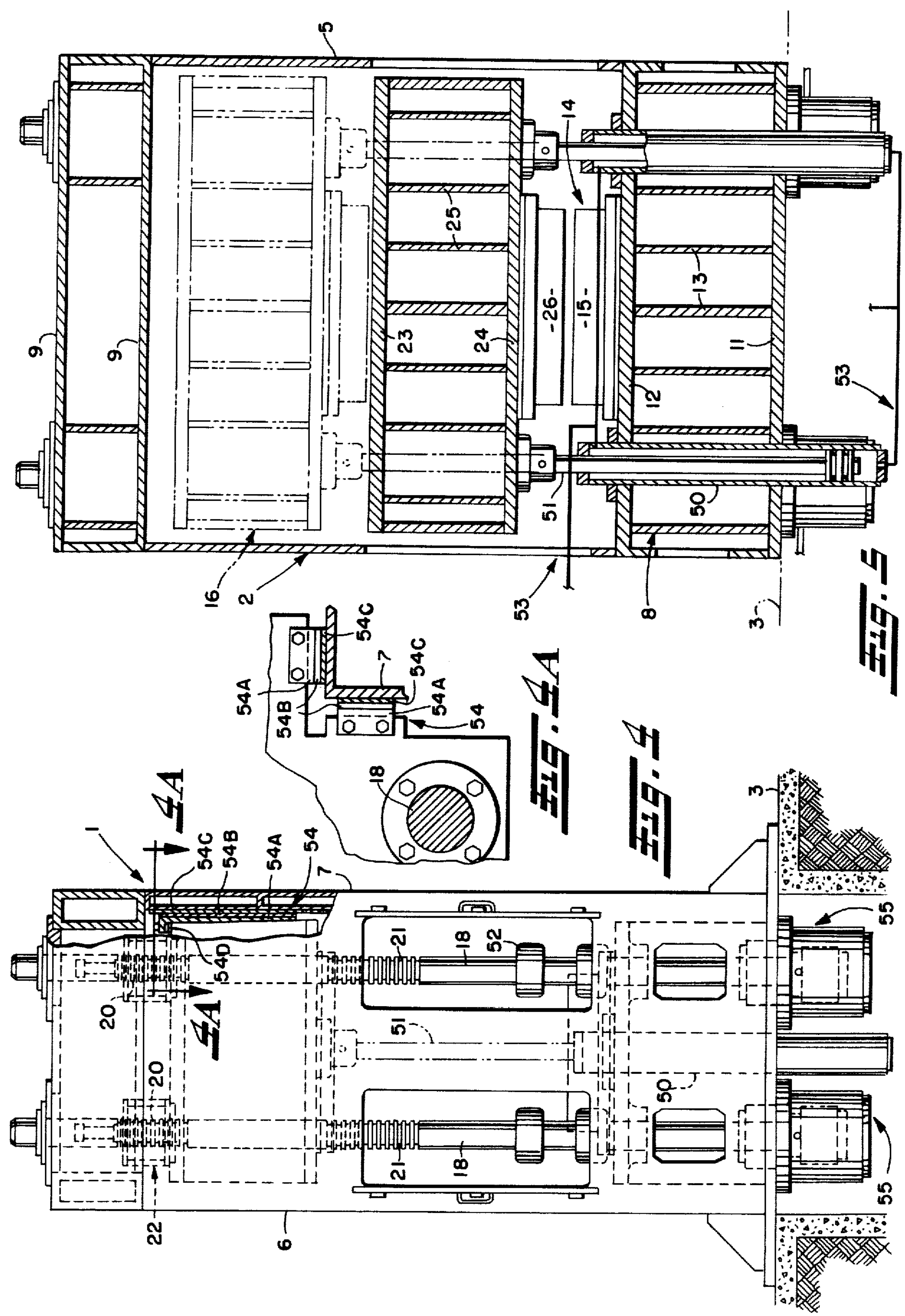

ENCODER
CPU
SERVO CONTROL
FLOW DIVIDER

HYDRAULIC PRESS

BACKGROUND AND SUMMARY OF THE INVENTION

The present invention relates to a hydraulic press in general and to a hydraulic press having a precision controlled movable platen reliably to maintain desired movement velocities, parallelism and forming pressures in particular.

Hydraulic presses having a two-stage sequence of operation are well known in the art as shown in U.S. Pat. Nos. 3,540,081; 3,587,135; 3,606,638; 3,505,708; 3,697,212; 3,716,323, and in a Cincinnati Milacron Brochure on Plastic Injection Molding Machines. As exemplified by such teachings, these two-stage presses may include a movable platen initially rapidly cycled from an open position to a substantially closed pre-form position under low pressure, and then cycled from the pre-form position to a closed forming position under higher pressure. These presses may include various clamping mechanisms selectively to connect the movable platen to a central drive shaft or pull down rods, and still other exemplary clamping mechanisms used in the press art are shown in U.S. Pat. Nos. 3,941,141; 3,050,943; 3,603,248; and 3,756,145. These two stage presses do not provide the control over the movable platen that is necessary to provide the parallelism, forming speeds and part reliability required in certain industries.

In this regard, the press forming of certain materials requires specialized and exacting operational parameters to be employed in producing parts to tight dimensional tolerances and strength levels. These requirements have heretofore been difficult to achieve in cost effective manufacturing procedures because of the practical limitations of the machinery in the operative context of the materials forming environment. For example, some plastic materials are rather frequently formed into parts having not only intricate surface contours but also uniform cross-sectional strength standards. The mold forms and molding parameters may be empirically determined, but the known presses have been unable to satisfy these empirical determinations with the reliability and operational speeds preferred. This is caused from the presence of one or more of the following limiting factors: slowness in molding; lack of precise control over the movable platen; lack of parallelism between the movable and fixed platens; and lack of adjustment mechanisms immediately to compensate for loading and/or operational problems.

The principal object of the present invention is to provide a press that can closely and reliably control forming velocities, pressures and parallelism in rapidly performed operational cycles.

A further object of the present invention is to provide a movable platen that may be quickly driven along four pull down power rods between an elevated open position and a lowered reference position in which the movable platen is exactly parallel to the lower platen. This movement between the upper and reference positions is accomplished by fast acting, relatively low pressure piston-cylinder assemblies extending between a fixed base and said movable platen.

Another object of the present invention is to provide a high pressure forming stroke for a dimensionally reinforced movable platen by clamping the movable platen to the four pull down power rods in the reference position and by then driving the four pull down power rods under high forming pressure to bring the movable platen into mating engagement with the fixed platen. The high forming pressure is achieved by short stroke piston-cylinder assemblies respectively positioned under and simultaneously driving each of the four pull down power rods to lower the same, with such arrangement reducing the press height required and improving forming stroke control.

Still another object of the present invention is to provide precise control over the movable platen during its short forming stroke reliably to meet the operational forming parameters required by the material and mold shape being processed. This precise control may be accomplished by the drive and mechanical guidance structure cooperating with a feedback system. This feedback system continuously monitors the conditions occurring during the forming stroke of the movable platen and comparing such conditions to the preselected desired conditions. If correction is required, the feedback system controls the main and auxiliary hydraulic oil supply lines independently to adjust the oil supply to the high pressure cylinder or cylinders requiring correction while the other high pressure cylinders are simultaneously being supplied in accordance with normal requirements.

Yet another object of the present invention is to provide readily accessible and fail safe clamping structure selectively to secure the movable platen to the pull down power rods. To this end, a wedge ring clamping assembly is mounted on the movable platen for each pull down rod, and each assembly includes a single annular wedge ring operative to cam a plurality of segments into locking engagement with their respective pull down rod. The wedge ring cam surface and segment cam follower surfaces are cooperatively inclined at a self locking angle to provide fail safe clamps.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 4 is a side elevation of the hydraulic press taken generally along the plane 4—4 in FIG. 1 showing the positioning of the long stroke, piston-cylinder assemblies relative to the pull down power rods and overall press mechanism, and further showing, in partial section, the guidance assembly for the movable upper platen;

FIG. 4A is a fragmentary section taken along the plane 4A—4A in FIG. 4 showing two of the wedge guide mechanisms at one of the four corners of the movable platen;

FIG. 5 is a front vertical section of the hydraulic press illustrating the hydraulic control of the long stroke piston-cylinder assemblies which may be selectively actuated to lower the upper movable platen from a phantom line open position to a full line reference position in which the upper movable platen is immediately adjacent to and absolutely parallel with the lower fixed platen;

DESCRIPTION OF THE PREFERRED EMBODIMENT

Figure 1:
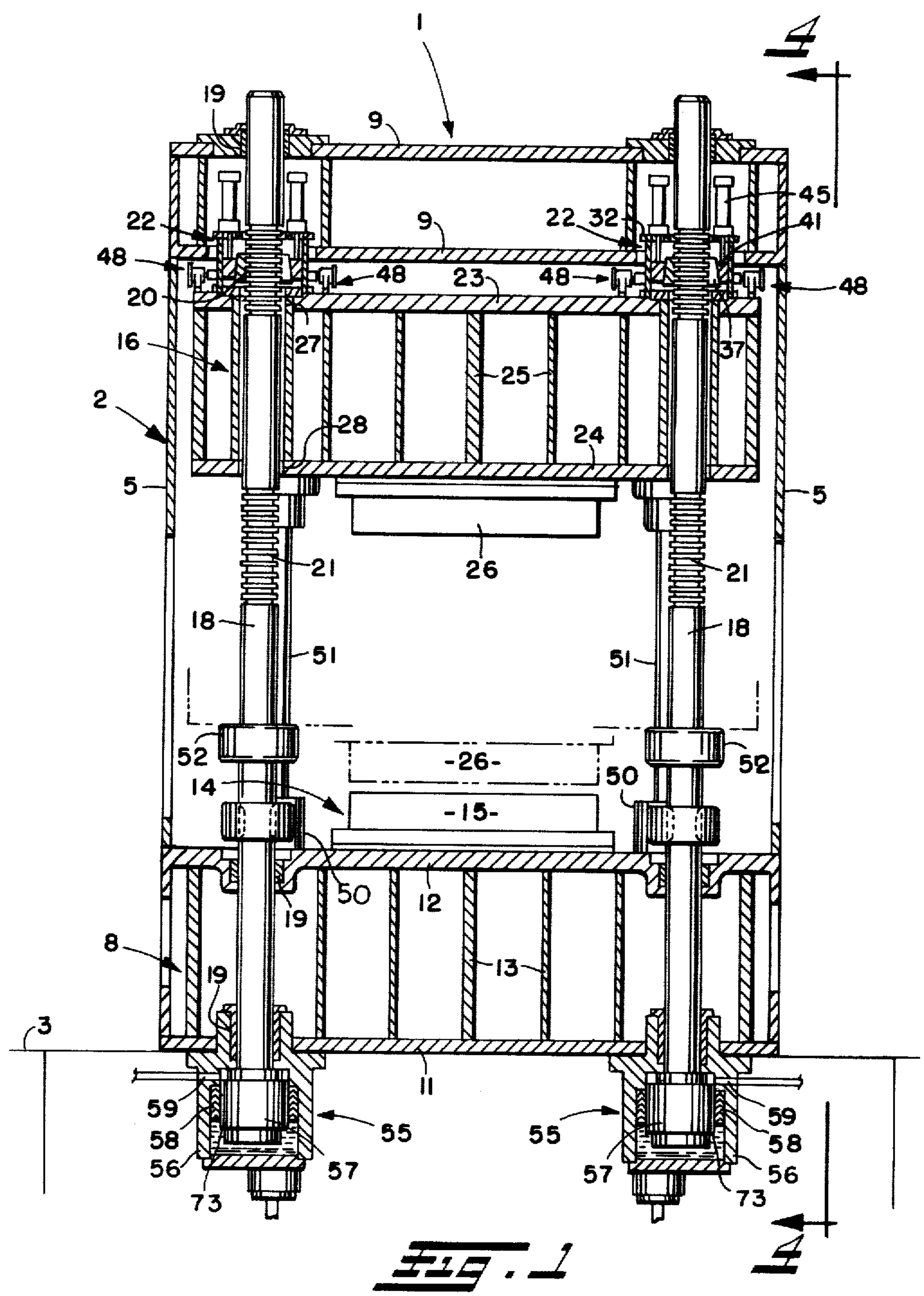
FIG. 1 is a vertical front section of the hydraulic press of the present invention showing the movable platen in its upper locked position.

Referring now in more detail to the drawings and initially to FIG. 1, the press of the present invention indicated generally at 1 includes a frame 2 positioned on and rigidly secured to base 3. The overall press frame 2 includes side walls 5, reinforced front and back frames 6 and 7, a reinforced bottom bed 8 and a top entablature 9. The reinforced bottom bed 8 is part of the frame 2 and includes a horizontally oriented bottom plate 11 on base 3, a horizontally oriented support plate 12 positioned above and parallel to bottom plate 11, and a series of vertically oriented, load bearing reinforcing partitions 13 extending therebetween. The horizontally oriented support plate 12 has a stationary platen indicated generally at 14 mounted thereon. Such stationary platen 14 may include a fixed lower mold half 15. The stationary platen 14 operatively cooperates with a movable upper platen indicated generally at 16, which selectively travels along four vertically oriented corner pull down power rods 18.

Such pull down power rods 18 have high loading capacity, for example, 300 tons, and are respectively mounted in and guided by frame 2 for selective reciprocal vertical movements by vertically spaced bushings 19 positioned in top entablature 9, and bottom bed 8. Each of the four pull down power rods 18 includes an upper series of horizontally oriented grooves 20 and a lower series of horizontally oriented grooves 21, with these grooves preferably being of an Acme type. Each groove in the upper and lower groove sections of one pull down power rod is equal in elevation to and identical in configuration with the correspondingly positioned groove in each of the other pull down power rods. These upper and lower groove sections 20 and 21 on pull down power rods 18 cooperate with clamping assemblies 22 carried by the movable platen selectively to lock the movable platen 16 to the pull down power rods 18.

The reinforced movable platen 16 includes a top plate 23, a bottom plate 24, and vertically oriented load bearing reinforcing partitions 25 extending therebetween. Depending upon the press environment, the movable upper platen may further include a top mold half 26, which is centrally secured to and extends below the bottom plate 24 of the movable platen 16. The four pull down power rods 18 extend through vertically aligned apertures 27 and 28 respectively positioned in the top plate 23 and bottom plate 24 of the movable platen 16 adjacent each of the corners thereof. The top plate 23 of movable platen 16 has four wedge ring clamping assemblies 22 secured thereto and extending thereabove.

Figures 2, 3:
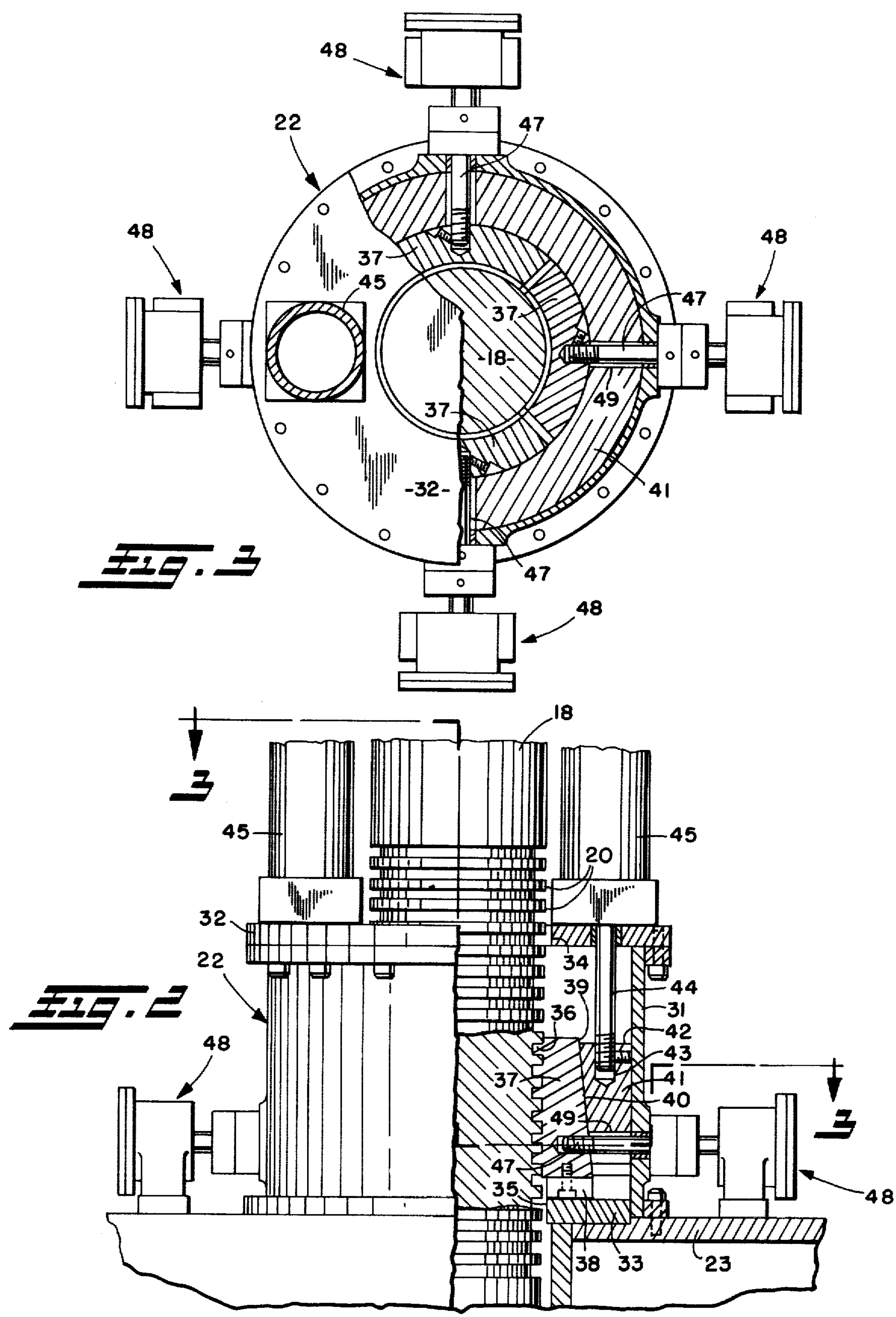
FIG. 2 is a fragmentary elevation partially in section showing the details of the wedge ring locking assembly selectively to lock the movable platen to a pull down power rod.
FIG. 3 is a plan view partially in section taken generally along the line 3—3 in FIG. 2 showing the cooperative interrelationship between the wedge ring and locking segments when the radially inner grooves on the latter matingly engage corresponding grooves on the associated pull down power rod.

As best seen in FIGS. 2 and 3, each wedge ring locking assembly 22 includes a cylindrical housing 31 having top and bottom walls 32 and 33, respectively. The top and bottom plates 32 and 33 have vertically aligned and equally sized apertures 34 and 35 therein to permit the vertically oriented pull down power rod 18 associated therewith to pass therethrough. The groove section 20 or 21 on rod 18 selectively positioned within the cylindrical housing 31 cooperatively mates with similarly configured grooves 36 positioned along the radially inner surface of each of four arcuate gripping segments 37. These segments 37 surround the pulldown power rod 18 and are supported by bottom plate 33 for guided radially inwardly and outwardly directed movements relative to the pull down power rod 18, with dovetail slides 38 being illustrated as exemplary guiding mechanisms.

To obtain this radial movement, the radially outer surface of each segment 37 is inclined outwardly from top to bottom at a self locking angle as shown in FIG. 2 to form a cam follower surface 39. Such surfaces 39 cooperate with equally inclined cam surfaces 40 on annular wedge ring 41. As best shown in FIG. 3, the wedge ring 41 surrounds the four segments 37. The radially outer surface of wedge ring 41 abuts against and is guided by the radially inner surface of cylindrical housing 31 to permit controlled vertical reciprocal movements of the wedge ring therealong.

To this end, the top surface 42 of wedge ring 41 has two diametrically opposed tapped holes 43 therein threadingly to receive the lower ends of piston rods 44 of the locking piston-cylinder assemblies 45 associated therewith. These two piston-cylinder assemblies 45, which are preferably pneumatically operated, are secured to and positioned above the top plate 32 of the housing, with their piston rods 44 extending through apertures in such top plate. The two piston-cylinder assemblies 45 are selectively simultaneously actuated to either lock the movable platen to the pull down power rod 18 or to unlock the movable platen from the rod.

In this regard, the locking stroke of the two piston rods 44 drives the wedge ring 41 downwardly to move the cam surface 40 thereof downwardly along the follower surfaces 37 of each of the gripping segments. This camming movement of the wedge ring 41 is translated into radially inwardly directed movement for the four segments 37. These segments 37 continue this radially inwardly directed movement until the grooves 36 on their inner arcuate surfaces matingly interfit with the correspondingly positioned grooves on pull down power rod 18, thereby to provide a positively held, rigid lock therebetween, as illustrated in FIG. 2. Even if the piston cylinder assemblies 45 should inadvertently malfunction, the segments 37 would remain in their clamped condition with the respective grooves interlocked because of the self locking angles of approximately 7° relative to the vertical employed for the cam and cam follower surfaces.

To release the four gripping segments 37 from their locking engagement, the piston-cylinder assemblies 45 are reversed vertically upwardly to drive piston rods 44 and the wedge ring 41 connected thereto. This lifting movement of the wedge ring 41 permits the segments 37 to return to a radially expanded unlocked position. This return may be accomplished by each of the four gripping segments having return rods 47 extending outwardly therefrom to retraction piston-cylinder assemblies indicated generally at 48. These return rods 47 are received in and extend through vertically elongated slots 49 in wedge 41 to permit the vertical reciprocal wedge ring movements to be made without interference, while also permitting the radially outwardly directed withdrawal movement of the rods to be made without interference. This locking and unlocking function is simultaneously selectively performed by all four of the clamping mechanisms 22 in two positions of the upper movable platen 16.

In this regard, the upper platen 16 has a first elevated position shown in full lines in FIG. 1 in which the press is open. In such open position, the lower and upper mold halves 15 and 26, respectively, may be changed, maintenance may be performed, and the lower mold half may be filled with the material to be processed. The upper platen 16 is held in such elevated or open position by two hydraulic piston-cylinder assemblies 50 positioned at opposite sides of the mold halves 15 and 26 generally between the adjacent pull down power rods 18, as best illustrated in FIGS. 4 and 5. These piston-cylinder assemblies 50 are fixedly secured in the bottom bed 8 of press 1 and the piston rods 51 thereof extend upwardly to their connections with the upper movable platen 16. Such piston-cylinder assemblies 50 have relatively long strokes and operate under relatively low pressures exerted by oil supplied to either side of the pistons through conventional hydraulic lines indicated generally at 53. In the extended position of the piston rods 51 for piston-cylinder assemblies 50, the upper movable platen 16 is positively held in its elevated position, and the four wedge ring locking assemblies 22 may also be engaged positively to lock the movable platen to the four pull down power rods 18 to provide further safety in maintaining the press open.

When the movable platen is to be cycled downwardly, the wedge ring locking assemblies 22 are released and the piston-cylinder assemblies 50 are actuated to retract the piston rods 51 thereof to accurately lower the upper platen 16 at relatively high speeds, with the pull down rods 18 being fixed during this phase of upper platen travel. This downwardly directed movement of the upper platen 16 along the four pull down rods 18 extending upwardly therethrough is accurately guided adjacent its four corners.

To this end, two wedge guide mechanisms, indicated generally at 54, are positioned adjacent each of the four corners of the movable platen at right angles to one another as shown in FIG. 4A cumulatively to provide eight positions of control, adjustment and guidance. Each wedge guide mechanism includes a wedge shoe 54A adjustably mounted on the movable platen 16. The wedge shoe 54A carries a removable wear plate 54B that slides along an elongated wear plate 54C removably attached to the reinforced frame members 6 and 7. These elongated wear plates 54C extend vertically along substantially the entire height of such frame members to be at least coextensive with the greatest magnitude of vertical travel for the upper platen. If adjustment is necessary, the wedge shoe 54A may be vertically adjusted, as necessary, by varying the number of shims 54D under the fastening shoulder of the shoe to cam the wear plate 54B into sliding contact with the elongated wear plate 54C. In addition, the wear plates themselves may be replaced if necessary and the wedge shoe adjusted accordingly. These eight wedge guide mechanisms 54 accurately center and guide the upper platen during its movement.

In the initial downward movement of the platen 16 from the open position, the long stroke piston-cylinder assemblies 50 are programmed to bring such upper platen 16 into controlled engagement with four adjustable stops 52 similarly positioned on each of the pull down rods 18. These stops 52 may be adjusted upwardly or downwardly in equal increments along the pull down rods 18, and the stroke of the low pressure piston-cylinder assemblies 50 may also be correspondingly adjusted to obtain the controlled engagement desired. This adjustability permits the press to be readily adapted to and used with molds and/or parts of varying sizes.

Figures 6, 7:
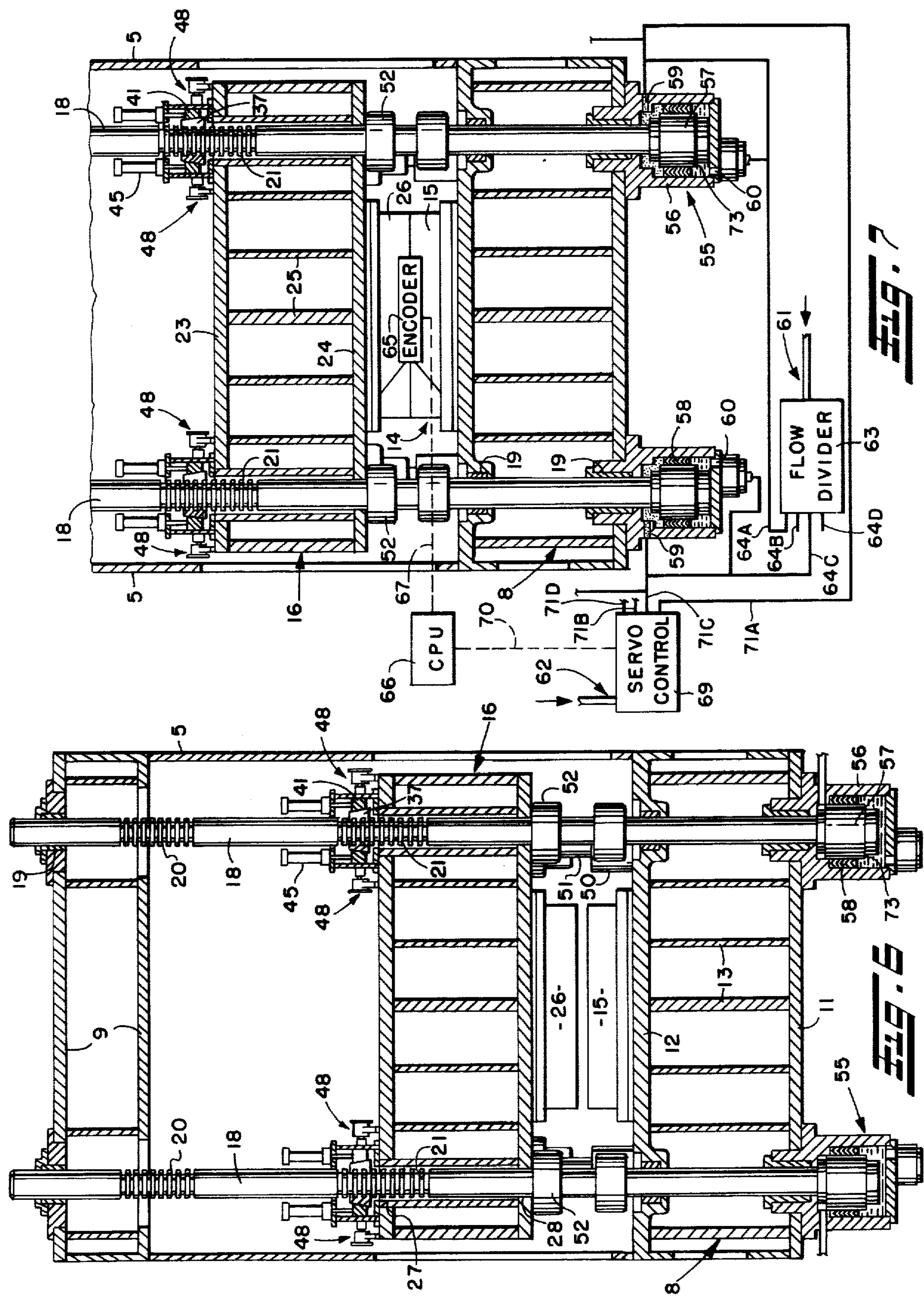
FIG. 6 is a vertical elevation of the hydraulic press similar to FIG. 1 but showing the upper platen in its reference position in which the wedge ring locking assemblies have been activated to lock the upper platen to the four pull down power rods.
FIG. 7 is a fragmentary front vertical section of the hydraulic press showing the hydraulic fluid control system and the short stroke, high pressure piston-cylinder assemblies being activated to bring the upper platen into the closed forming position relative to the lower platen.

As shown in FIGS. 5 and 6, when the long stroke piston-cylinder assemblies 50 have lowered the movable platen 16 into controlled engagement with the stops 52, such upper platen 16 is in a reference position immediately adjacent to and parallel with the lower mold half 15 and fixed platen 14. This reference position is extremely important to the precision control of the hydraulic press of this invention since the load stroke for the upper platen can always begin from a predictable position of absolute parallelism.

To go from the reference position to the closed and fully loaded position, the upper platen 16 is initially locked to the four pull down power rods 18 to provide dimensional rigidity for the upper platen. Such locking is accomplished, of course, by the four clamping assemblies 22 being simultaneously actuated positively to interfit the grooves 36 on segments 37 with the lower grooves 21 on the respective pull down rods 18. When thus locked, the high pressure, short stroke piston-cylinder assemblies, indicated generally at 55, may be actuated to apply the forming load with high force.

In this regard, the lower ends of each of the pull down rods 18 extend into high pressure cylinders 56 positioned beneath the base level 3. The bottom ends of such pull down rods 18 are provided with pistons 57 which are slidingly sealed at 58 to the inner wall of cylinder 56. The introduction of high pressure oil into the upper ports 59 of each of the high pressure cylinders 56 with simultaneous controlled relief of the oil on the lower side of the piston through bottom ports 60 in well known manner results in the pistons 57 being forced downwardly along the bore of cylinder 56. This high pressure but short stroke advancement of the pistons 57 simultaneously drives not only the four pull down rods 18 downwardly but also the upper platen 16 locked thereto by clamping assemblies 22. This final high pressure movement to bring the upper mold half 26 into loaded engagement with the lower mold half 15 to form the material placed therein into the product configuration is performed under very tight feedback controls monitoring and correcting, if necessary, pressure, velocity and parallelism.

To this end, the feedback control system includes a hydraulic fluid system having a main supply, indicated generally at 61, and an auxiliary supply indicated generally at 62. As shown in FIG. 7, the main supply 61 directs oil from a high pressure pump into a flow divider 63 for separate but equal delivery along conduits 64A-D to either the top or bottom inlet ports of each of the four high pressure cylinders 56. This high pressure main feed, when directed through top inlet ports 59 in each of the cylinders 56, drives the short stroke forming pistons 57 downwardly to move the rigidified upper platen 16 and upper mold half 26 toward the stationary lower mold half 15, with this movement being closely monitored by an encoder 65 carried by the respective mold halves. This encoder instantaneously monitors and determines the force being applied at that given instant, the velocity of the upper mold half relative to the lower mold half and the parallelism between the upper mold half and lower mold half. These instantaneously monitored and determined values are fed from encoder 65 to a computer 66 by an electrical circuit 67 as part of the feedback control system. This computer 66 is programmed to compare the instantaneous values being determined to the force, velocity and parallelism values desired at that time.

If corrections are required, the computer 66 sends signals as required to a servo control valve 69 by way of electrical circuit 70. This servo control valve 69 controls the flow of pressurized oil coming from the auxiliary supply 62 incorporating an auxiliary pump. The pressurized oil output of the servo control valve 69 is divided, as required, to flow into one or more of the four conduits 71A–D respectively leading to the top ports 59 in each of the high pressure cylinders 56. Thus, if one side of the movable platen 16 is cocked slightly during the loading stroke advance because of asymmetrical loading being caused by the placement and/or the uneven flow of the material being processed, the servo control valve 69 will respond to the corrective signal generated by the encoder 65 and computer 66. This correction is accomplished by additional measured amounts of oil selectively being supplied through one or more of the conduits 71A–D to the affected cylinder or cylinders 60 to correct the uneven loading, thereby immediately to bring the movable platen 16 back into the desired operating mode for force, velocity and parallelism characteristics.

Although the operation of the press should be clear from the above description, a full cycle will be briefly described below for sake of completeness beginning with the upper platen 16 in its open, elevated position with all four clamping mechanisms actuated to urge segments 37 into locking engagement with grooves 20 on each of the pull down rods 18 as illustrated in FIG. 1. In such position, the material to be processed, for example, fiberglass, is placed in the cavity of the lower mold half 15.

The cycle begins by the clamping mechanisms 22 being unlocked through the wedge rings 41 being elevated by piston-cylinder assemblies 45 simultaneously to permit the radial expansion of segments 37 under the bias of piston-cylinder assemblies 48 to disengage grooves 20 and 36. The two piston-cylinder assemblies 50 are then actuated to retract piston rods 51 thereby to lower upper platen 16 along the pull down rods 18 into controlled engagement with stops 52 as illustrated in FIGS. 5 and 6. At this reference position, the piston-cylinder assemblies 45 are reversed to drive segments 37 into locking engagement with grooves 21 on each of the pull down rods 18 to connect the movable platen to the pull down rods for dimensional rigidity and control during the loading stroke. When thus locked, the short loading stroke is begun under preprogrammed conditions equally to feed high pressure oil from a main supply 61 into the tops of each of the cylinders 56 to drive pistons 57, pull down rods 18, upper platen 16 and upper mold half 26 downwardly. The loading movement of the upper mold half 26 toward lower mold half 15 is continuously monitored to determine instantaneous values of force, upper mold half velocity and upper mold half parallelism relative to the lower mold half. If any of these values varies from the desired value for that given time frame, the computer sends a feedback signal to servo valve 69 which responds by directing measured amounts of oil from auxiliary supply 62 to the affected cylinder or cylinders 56 to correct the problem and bring the actual operating parameters back into conformance with the desired operating parameters. At the conclusion of the loading stroke, the mold halves 15 and 26, which may be heated, are in mated engagement to form the part alone or in conjunction with closely controlled heat.

When separation of the mold halves is desired, the initial movement of the upper mold half is preferably at a reduced rate to avoid part damage. To this end, the piston 57 is preferably stepped in construction so that the introduction of high pressure hydraulic oil through bottom port 60 initially acts against a limited area shoulder 73 of the piston slowly to lift the upper platen 16 for controlled separation of the mold halves 15 and 26.

At this point, the operational sequence may vary depending upon the type of part and/or material being handled. For example, after slight separation, the surface of the formed part may be treated before returning the mold halves to a closed and loaded condition for further pressure and heat treatment of the part. In any event, the upper platen is ultimately returned to its upper position by initial controlled separation as described followed by the oil acting against the entire bottom surface of the piston 57 quickly to return the platen 16 to its reference position. The operational steps described for movement from the upper to reference positions are then reversed to open the press. The overall operational sequence can be automatically programmed and controlled to minimize cycle time while continuously producing parts that are reliable and meet the established specifications.

Although the invention has been shown and described with respect to a preferred embodiment, it is obvious that equivalent alterations and modifications will occur to others skilled in the art upon the reading and understanding of this specification. For example, the press of the present invention could be oriented horizontally rather than vertically. The present invention includes all such equivalent alterations and modifications, and is limited only by the scope of the claims.

The embodiments of the invention in which an exclusive property or privilege is claimed are defined as follows:

1. A press comprising: a frame; a fixed platen in said frame; a plurality of parallel rods each having grooves on the outside diameter and said rods mounted to said frame for selective axially guided movement relative thereto; a movable platen mounted on said rods for selective movement therealong toward and away from said fixed platen; clamp means selectively operative to lock said movable platen to said parallel rods; said clamp means including wedge ring locking assemblies carried by the movable platen for each of the rods; each said wedge locking assembly having radially driven segments with grooves on the radically inner surfaces thereof selectively to mate with said grooves on the outside diameter of its associated rod selectively to affect a lock therebetween; a first, long stroke piston-cylinder assembly means extending between said frame and said movable platen selectively reciprocally to drive said movable platen along said parallel rods; a second short stroke piston-cylinder means operative reciprocally axially to drive said parallel rods relative to said frame; and control means sequentially operative (a) to drive said movable platen between an open position spaced from said fixed platen and a reference position immediately adjacent to and parallel with said fixed platen by selective energization of said first long stroke piston-cylinder assembly means when said clamp means is unlocked, and (b) to drive said rods and said movable platen with force, velocity and parallelism control between said reference position and a position in which the platens are closed under load by selective energization of said second short stroke piston-cylinder assembly means when said clamping means is locked.

2. The press set forth in claim 1 wherein each said wedge lock assembly includes wedge ring means having inclined radially inner cam surfaces moving along matingly inclined, radially outer follower surfaces on said segments, said wedge ring means being reciprocally driven to move coaxially with the axis of its associated rod either to cam said segments radially inwardly into positive locking engagement or to release said segments for radially outwardly directed unlocking movements.

3. The press set forth in claim 2 wherein said wedge ring means is a single, annular wedge ring having a radially inner cam surface inclined at a self locking angle to cooperate with the radially outer cam follower surfaces on said segments similarly inclined at the same self locking angle to provide a fail safe lock.

4. The press set forth in claim 1 wherein said rods are vertically oriented and said short stroke piston-cylinder assemblies are positioned beneath each such rod with the posts respectively forming the piston rods of said short stroke piston-cylinder assemblies.

5. The press set forth in claim 1 wherein said control means includes a pressurized hydraulic fluid system selectively to provide the motive force for said piston-cylinder assemblies and further includes valve means in said hydraulic fluid system selectively to supply hydraulic fluid to said short stroke piston-cylinder assemblies in amounts controlled to maintain parallelism and desired force and velocity levels between the movable and fixed platens during loading movement of the former from the reference position to the closed position.

6. The press set forth in claim 5 wherein said hydraulic fluid system includes a main fluid supply having a flow dividing valve to equally and simultaneously supply hydraulic fluid to all short stroke cylinders and an auxiliary fluid supply including a valve selectively to supply hydraulic fluid in limited and measured amounts to one or more of said short stroke cylinders as required to maintain parallelism, velocity and force control.

7. The press of claim 7 wherein said control means further includes an encoder carried by said movable and fixed platens continuously to monitor parallelism, velocity and force therebetween and also includes a computer operative to receive signals from the encoder as to parallelism, velocity and force and to then control the valves by interrelating the signals received to a predetermined standard to make hydraulic fluid flow adjustments, if necessary, to maintain the desired parallelism, velocity and force levels.

8. The press of claim 1 wherein said rods are vertically oriented, are four in number, and are positioned at the four corners of the movable platen, said fixed platen includes a stationary mold half mounted thereon and said movable platen includes a mold half mounted thereon for movement therewith.

9. The press of claim 1 wherein the control means includes an adjustable stop on each said rod and means to adjust the length of stroke for the long stroke piston-cylinder assembly means, the reference position of parallelism for the movable platen being determined by space requirements and then being reliably established by equally adjusting each of the stops to the same determined position on each of the rods and by correspondingly adjusting the stroke of the first long stroke piston-cylinder assembly means to accurately bring the platen in precisely controlled movement against the stops.

10. The press of claim 1 wherein the movable platen has four pairs of wedge guide mechanisms respectively adjacent its four, corners to cooperate with the frame to center and geometrically stabilize the movable platen during its movements.

11. The press of claim 10 wherein the wedge guide mechanisms of each pair are at right angles to one another and are adjustable as required by wear to maintain the cooperative guidance function with the frame.

12. A hydraulic press comprising a frame, a fixed platen secured to said frame, a plurality of power rods mounted on said frame for selective movement relative thereto, a movable platen selectively traveling along said power rods and being guided by said frame between open, reference and closed positions relative to said fixed platen, clamp means selectively to lock said movable platen to said power rods, said clamp means including a wedge ring at each power rod selectively operative to cam segment means into locking engagement with their respective rods and positively to maintain such lock, until mechanical release, by the cam surfaces being inclined at self locking angles, and hydraulic means sequentially to drive said movable platen along said power rods between said open position and said reference position and to then drive said power rods and the movable platen clamped thereto between said reference position and said closed position.

* * * * *